April 2, 1935.  G. K. McCANN  1,996,249
FITTING
Filed Oct. 24, 1929

INVENTOR
GEORGE K. McCANN
BY
H. O. Clayton
ATTORNEY

Patented Apr. 2, 1935

1,996,249

UNITED STATES PATENT OFFICE 1,996,249

FITTING

George K. McCann, South Bend, Ind., assignor to Bendix Brake Company, South Bend. Ind. a corporation of Illinois Application October 24, 1929, Serial No. 402,097

8 Claims. (Cl. 188—205)

This invention relates to fittings and is illustrated as embodied in a novel fitting serving as a support for control mechanism for a front wheel automobile brake.

An object of the invention is to provide an extremely simple and compact fitting adapted to be secured to a brake or equivalent support plate and which fitting is particularly designed to support one end of a flexible conduit housing for a power transmission cable passing therethrough.

In a preferred embodiment of my invention, I have disclosed a fitting comprising telescoping parts, one part adapted to be secured to a support and the other part fixedly mounted on the element to be supported and which latter part telescopes within and is supported by the first-mentioned part.

The above and other details of construction and novel features of the invention will become apparent from a detailed description of a preferred embodiment of my invention disclosed in the accompanying drawing, in which:

Figure 1 discloses in side elevation my novel fitting mounted on a brake support plate for a steerable automobile front wheel;

Figure 2:
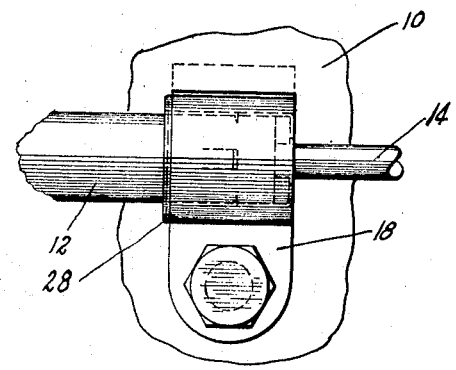
Figure 2 is an enlarged detail of the parts of the fitting mounted on the brake backing plate.
Figure 3:
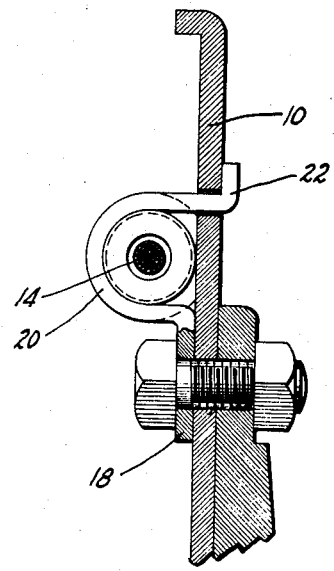
Figure 3 is a partial section through the backing plate on the line 3—3 of Figure 1 showing the fitting parts in end elevation.
Figure 4:
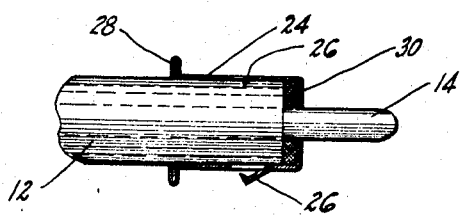
Figure 5:
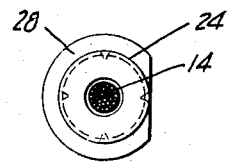

Figure 4 discloses in longitudinal section the sleeve portion of the fitting mounted on the end of the element to be supported; and Figure 5 is an end view of the fitting part of Figure 4.

Figure 1:
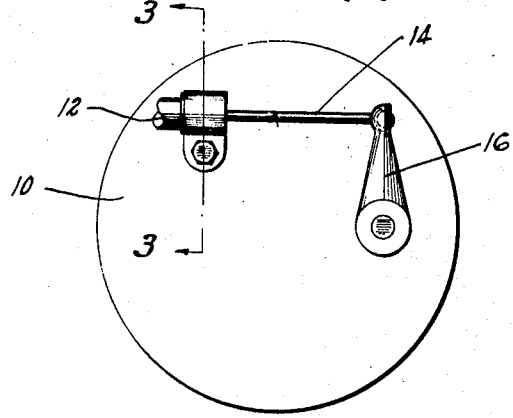

As shown in Figure 1, the fitting is adapted to be secured to the outside of a brake support plate 10 of a dirigible automobile wheel. The fitting serves to support one end of a flexible conduit 12, the latter housing a power transmission cable member 14 secured to means such as a crank arm 16 to operate the brake.

In detail, the fitting comprises a plate 18 formed as a stamping of a relatively narrow strip of stock curved intermediate its ends at 20 to provide a supporting portion for the remaining part of the fitting described below. The stamping 18 may be flanged at its end 22 to contact the inner surface of the brake support plate and is preferably bolted to the plate at its other end by the bolts serving to secure the backing plate to the wheel axle flange. The curved portion 20 is adapted to receive the second part of the fitting, a cylindrically shaped sleeve member 24 securely attached to the rubber or other pliable surface of the conduit by means of hook-shaped tabs 26 compressible inwardly from the surface of the sleeve and embedded within said surface. The sleeve, which is preferably fabricated from a light stamping, may be flanged at its end and return bent to provide an annular flange 28 and is preferably flanged inwardly at its other end to provide a stop for the end of the conduit. A gasket 30 may be interposed between the end of the sleeve and the conduit to obviate the ingress and egress of foreign material.

With the sleeve 24 securely fixed to the end of the conduit the same is inserted within the plate 18, the flange 28 abutting the end of the plate thereby serving as a stop. As the tension element 14 is connected to the brake operating arm, separation of the parts of the fitting is obviated in one direction and the flange stop 28 determines the limit of movement of the sleeve in the other direction. If desired, one side of the annular flange 28 on the sleeve may be cut away, as indicated in Figure 5, to form a flat surface contacting with the flat side wall of the backing plate.

There is thus provided a very simple and cheaply fabricated fitting or support for the end of the flexible conduit, and it will be obvious that the parts of the fitting may, with equal facility, be adapted to other uses than that disclosed. For example, with slight modification of the part 18 the fitting might be attached to any other type of support and other types of conduits than that shown might be supported by such fittings.

While one embodiment of my invention has been described in detail, it is not my intention to limit the scope of the invention to that particular embodiment or otherwise than by the terms of the appended claims.

I claim:

1. A brake structure comprising, in combination with its support plate, a two-part fitting mounted thereon, one of said parts fixedly secured to said support and provided with a curved portion intermediate its ends to define a housing for the other fitting part including a sleeve for the reception of a brake control element having a flange at its end abutting one side of the first-mentioned part.

2. A brake structure comprising, in combination with its support plate, a two-part fitting mounted thereon, one of said parts fixedly secured at one end to said support and having its other end extending through the plate and contacting the inner side thereof, said part being further provided with a curved portion intermediate its ends to define a housing for the other part including a sleeve for the reception of a brake control element and provided with a flange at its end abutting one side of the first-mentioned part.

3. A two-part fitting of the type described comprising one part of relatively narrow width curved intermediate its ends to provide a housing for the other part including a sleeve adapted to nest within said housing, said last-mentioned part provided with a flange at one end to define a stop contacting with the housing and limiting relative movement between the parts in one direction and further provided with an inwardly extending flange at its other end and with fastening prong members struck in from the body of the part intermediate its ends.

4. A fitting comprising a clamp including a housing, a sleeve in the housing having an inturned flange on one end and an out-turned flange on its other end and a gasket in the sleeve seated on the inturned flange.

5. A fitting comprising a clamp including a housing, a sleeve in the housing, an inturned flange on one end of the sleeve, an out-turned flange on the other end of the sleeve and members on the sleeve intermediate the flanges compressible inwardly.

6. Transmission apparatus comprising a conduit formed of compressible material, a cable slidably mounted in said conduit, and a sleeve formed with internal hooks and secured to said conduit by means of said hooks being pressed into the conduit.

7. Transmission mechanism comprising a conduit formed of compressible material, a cable slidably mounted in said conduit, and a sleeve formed with hook shaped tabs struck inward from the surface of the sleeve and secured to the conduit by the tabs being pressed into the conduit.

8. A brake structure comprising, in combination, with its support plate, a two part fitting mounted thereon, one of said parts fixedly secured at one end to said support and having its other end extending through the plate and contacting the inner side thereof, said part being further provided with a curved portion intermediate its ends to define a housing for the other part.

GEORGE K. McCANN.